Dec. 19, 1933. E. E. DAVIDSON 1,939,879
WINDOW GUIDE CHANNEL AND METHOD OF MAKING SAME
Filed March 12, 1932
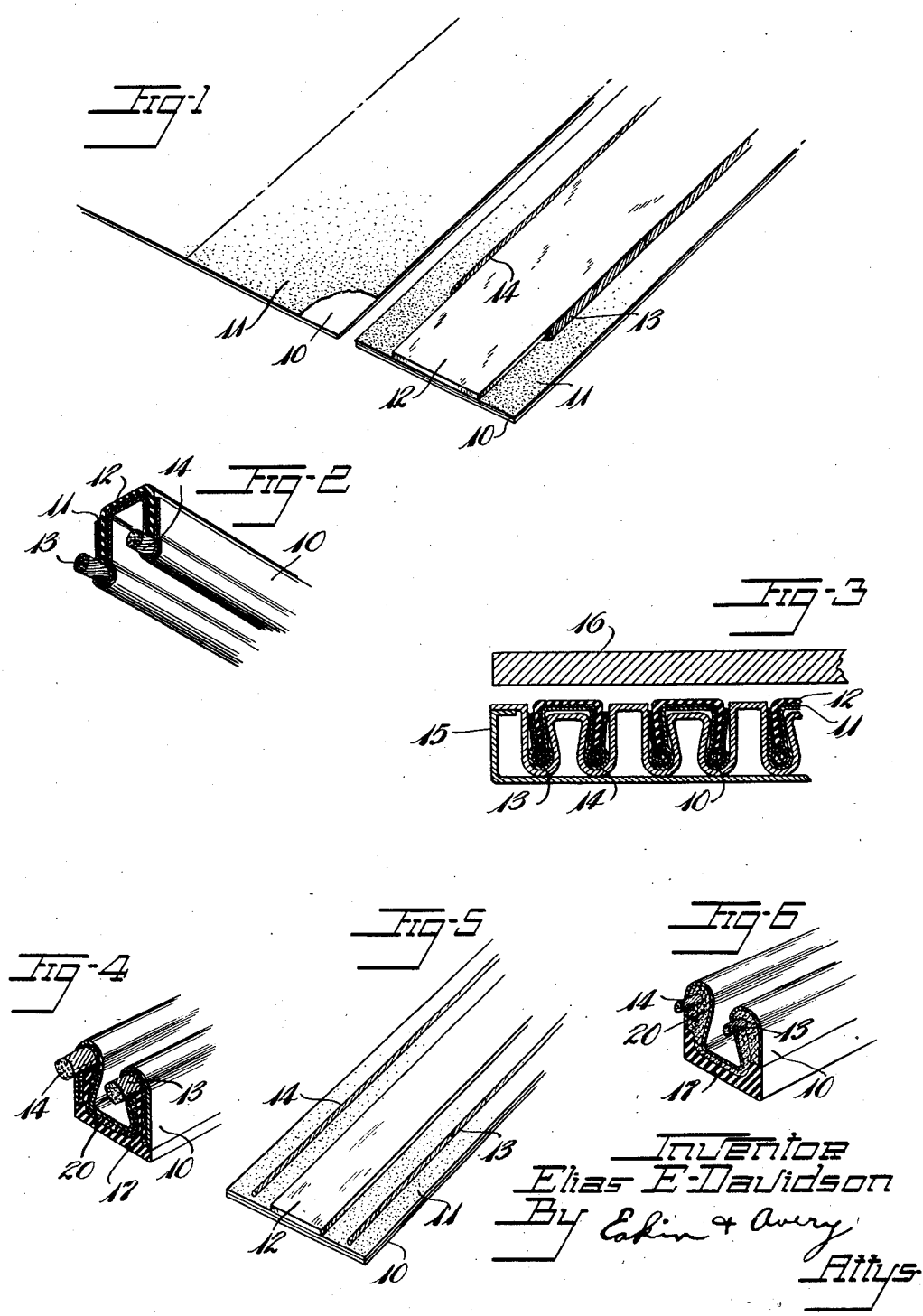
Inventor
Elias E. Davidson
By Eakin & Avery
Attys.

Patented Dec. 19, 1933

1,939,879

UNITED STATES PATENT OFFICE 1,939,879

WINDOW GUIDE CHANNEL AND METHOD OF MAKING SAME

Elias E. Davidson, Akron, Ohio, assignor to The B. F. Goodrich Company, New York, N. Y., a corporation of New York Application March 12, 1932. Serial No. 598,406

1 Claim. (Cl. 154—2)

This invention relates to window guide channel such as is used to cushion and guide sliding windows in automobiles or the like.

The principal objects of the invention are to provide effective cushioning of the window glass, desirable in portions of the channel strip, and to provide low cost of manufacture. A more specific object is economically to provide a channel strip having in its legs members adapted to provide a high degree of transverse cushioning and at the same time provide such longitudinal inextensibility in the legs as to prevent them from being buckled and caused to bend against the glass with excessive force by the friction of the glass sliding in contact with the legs.

Other objects will appear from the following description and the accompanying drawing.

In the drawing:

Fig. 1 is a perspective view showing successive steps in the manufacture of the preferred form of the article.

Fig. 2 is a perspective view of the same channel before being subjected to vulcanization.

Fig. 3 is a cross-sectional view of a mold transverse to the cavities thereof in which such channel strips are shown prior to vulcanization.

Fig. 4 is a perspective view of a section of the completed article.

Fig. 5 is a view similar to Fig. 1 showing a similar step in the manufacture of a modified form of the invention.

Fig. 6 is a view similar to Fig. 4 showing the modified form as completed.

Referring to the drawing, a sheet of felt or other suitable covering material 10 is first coated on one side by any well known method, as by calendering or spreading, with a layer of rubber compound 11 which may or may not have incorporated therein a blowing agent. This sheet of material is then slit to provide a plurality of strips, as by cutting along the dot and dash line of Fig. 1.

A narrower strip of rubber compound 12, adapted to be vulcanized to a semi-hard rubber consistency is applied medially thereof and a pair of soft fibrous cores 13, 14, such as cotton wicking, are assembled in the coating 11 adjacent the longitudinal edges of the strip 12. The cores 13, 14, may be aligned with the margins of the strip 12 as shown in Fig. 1 or spaced therefrom as shown in Fig. 5. The strip 12 and the cores 13, 14 may be applied simultaneously and progressively to the coating 11 in any known or suitable manner.

The extending margins of the strip 10 are then folded at the edge of the cores 13, 14 and the strip thus formed is folded on two lines between the cores 13, 14 to provide a channel as shown in Fig. 2. In the form shown in Fig. 5 this folding may be at the margins of the strip 12.

The unvulcanized channels so formed are next inserted in cavities between mold members 15 and 16 as shown in Fig. 3 and are subjected to vulcanization by applying heat to the mold.

During vulcanization the coating 11, if made of a composition containing a blowing agent, is expanded to form spongy rubber and causes the channel to take the shape of the cavity, and provides a cushioning layer of sponge rubber 20 next to the fabric cover throughout the extent of the latter. Where the compound does not contain a blowing agent the coating becomes set in the position assumed by the channel in the mold cavity without completely filling the cavity.

The article as made from the assembled strip of Fig. 1 is illustrated in Fig. 4, in which it will be noted that the soft fibrous cores are anchored in the edges of the sides of the channel where they provide a soft, yielding, beaded edge admirably adapted to cushion the glass without undue frictional resistance to the sliding of the glass. The base 17 of the channel resulting from the vulcanization of the rubber strip 12 to the consistency of semi-hard rubber provides sufficient rigidity to the channel so that longitudinal shifting of the channel in the runway is obviated even when only the ends of the channel are fastened in place. The rubber layer 20 serves to hold the parts in proper relation. The extension of the strip 12 into the sides of the channel provides sufficient rigidity to the sides of the channel to hold the wicking-cushioned margins in proper relation to the base of the channel, and prevents wadding of the wicking.

The article as made from the assembled strip of Fig. 5, using a sponge rubber compound for the coating 11 is shown in Fig. 6. In this form the semi-hard rubber of the base 17 extends only slightly into the sides of the channel and the coating 11 has been blown to form substantial cushions 20 of sponge rubber which unite the cores 13 and 14 to the cover 10 and provide additional cushioning of the sides of the channel.

I claim:

The method of making a window guide channel which comprises coating a strip of fibrous covering material, placing a base-forming strip of rubber composition longitudinally thereof, placing strips of soft, fibrous cushioning material on said covering material adjacent the margins of said base-forming strip, folding said covering material over said cushioning material, folding the assembled strip to channel form and submitting the strip to vulcanization.

ELIAS E. DAVIDSON.